Jan. 10, 1967   L. I. GOLDFISCHER   3,296,920
OPTICAL CORRELATOR
Filed June 21, 1963   3 Sheets-Sheet 1

INVENTOR.
LESTER I. GOLDFISCHER

BY *H. S. Mackey*

ATTORNEY.

Jan. 10, 1967  L. I. GOLDFISCHER  3,296,920
OPTICAL CORRELATOR
Filed June 21, 1963  3 Sheets-Sheet 2
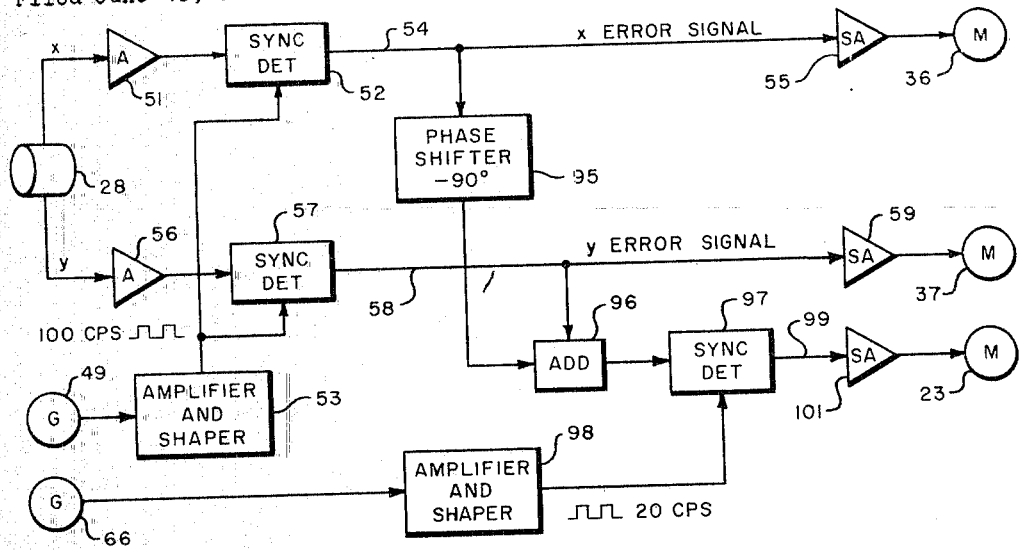
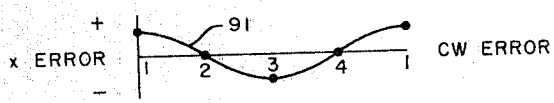
FIG. 8
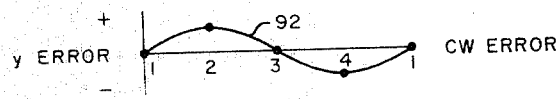
FIG. 9
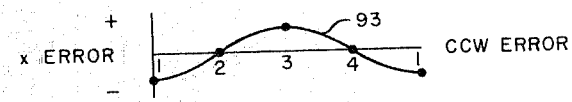
FIG. 10
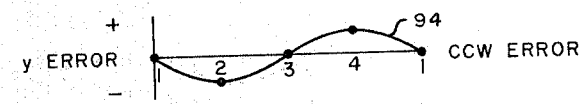
FIG. 11
INVENTOR.
LESTER I. GOLDFISCHER
BY H. S. Mackey
ATTORNEY.

Jan. 10, 1967    L. I. GOLDFISCHER    3,296,920
OPTICAL CORRELATOR
Filed June 21, 1963    3 Sheets-Sheet 3

INVENTOR.
LESTER I. GOLDFISCHER

BY
ATTORNEY.

United States Patent Office 3,296,920
Patented Jan. 10, 1967

3,296,920
OPTICAL CORRELATOR
Lester I. Goldfischer, New Rochelle, N.Y., assignor to General Precision, Inc., a corporation of Delaware
Filed June 21, 1963, Ser. No. 290,881
4 Claims. (Cl. 88—1)

This invention relates generally to optical correlators and particularly to a novel apparatus by which the correlation spot may be distinguished from the background illumination.

Auto correlation techniques may be regarded, in general, as addressed to the problem of matching, or bringing into registration, two areas containing essentially the same pictorial content. The simplest example is that of a pair of identical transparencies in contact with each other. When such a pair is held up to a light and one of them shifted with respect to the other, it is observed that maximum light is transmitted through the pair when best registration is achieved. A converging lens may be used to focus the transmitted light to a spot on the focal plane where it can be readily observed or measured.

A similar situation exists when the two transparencies are not in contact but rather are separated by a significant distance. Here again it is observed that maximum light is transmitted when best registration is achieved. It is also observed that, at best registration, the focal plane exhibits a bright spot, called the correlation spot, on the optical axis while the remainder of the focal plane is less brightly illuminated. When one transparency is translated without rotation, the correlation spot is correspondingly translated. Rotation of one transparency causes a blurring of the correlation spot which, upon continued rotation, completely disappears into the background.

When the two areas to be matched have the same pictorial content but different scale factors, that portion of the transmitted light representing the correlation function converges to a spot even without a lens. When the scale factors are widely different, as in the case of matching a transparency of an aerial photograph with the actual scene from which it was made, the focal plane lies quite close to the small scale version of the subject. This is the so-called lensless configuration and will be used to illustrate the principles of the present invention. As in the previous case, translation of one area (usually the small scale version) translates the correlation spot while rotation diffuses it.

Another effect becomes important with widely differing scale factors such as mentioned above when a small aerial photograph is to be matched with the actual terrain beneath an aircraft. In such a case the area of the aperture containing the photographic transparency is so small compared to the area of the actual scene that it forms an image of the terrain, regardless of the orientation or information content of the transparency, much as a pinhole forms an image. In general the image so formed is blurred and the pattern which appears on the detecting plane contains only the gross features of the scene. The correlation function is a sharply defined bright spot superimposed on the blurred image of the scene and the correlator, to be effective, must distinguish the correlation function from its background.

One solution to the problem proposed in the past requires that the photographic transparency be oscillated continuously about the optical axis of the apparatus. This solution is fully described in the co-pending application of George R. Gamertsfelder et al., Serial Number 275,475, filed April 22, 1963, for Image Correlator, and assigned to hte same assignee as is the instant application. As described in the cited application, it has been discovered that such oscillation causes the correlation spot to be diffused periodically into the background while the background illumination remains substantially unaffected. The signals generated by the radiation sensing device in the detecting plane therefore contain alternating components representing the correlation function which components can be detected and utilized both to adjust the mean angular position of the transparency and to position the transparency and/or the sensing device in translation for optimum correlation.

The above solution, while satisfactory for many purposes, is subject to the obvious mechanical problems inherently connected with oscillatory or reciprocatory motion.

It is a general object of the present invention to provide an improved optical correlator.

Another object is to provide a correlator which distinguishes the correlation function from the background illumination without requiring oscillating or reciprocating motion.

Briefly stated, a first shutter comprising alternately arranged diffusing and nondiffusing segments is positioned adjacent to the reference transparency and rotated continuously. The signals generated by the sensor therefore have alternating components which are detected and used to correct translational misalignment. A second shutter comprising a small transparent area with the remainder opaque is also positioned adjacent to the reference transparency and is rotated at a different speed. A second alternating component is thereby placed on the signals generated by the sensor which component is detected and used to correct rotational misalignment.

For a clearer understanding of the invention reference may be made to the following detailed description and the accompanying drawing, in which:

FIGURE 2 is a schematic diagram of the electric control circuitry of the invention;

FIGURES 8–11 are graphs useful in explaining the invention.

Figure 1:
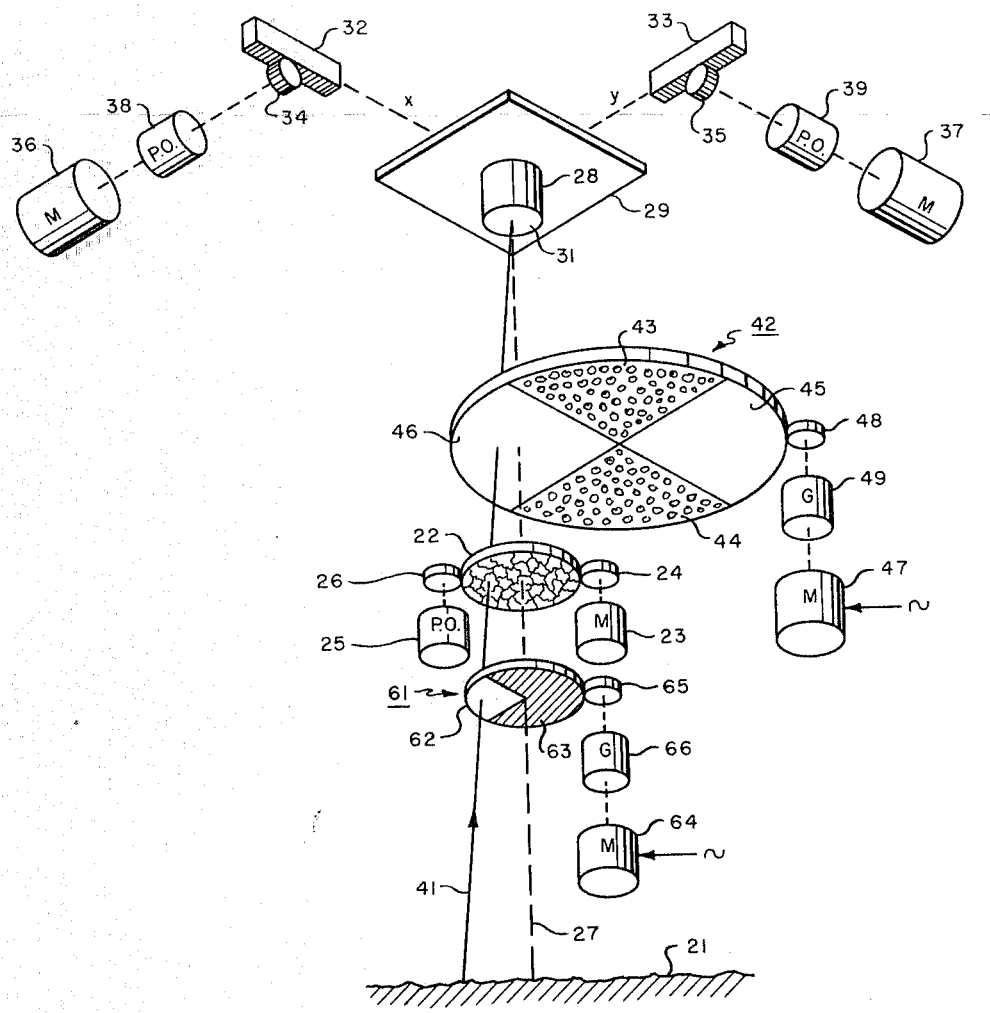
FIGURE 1 is a schematic diagram of the mechanical portions of the invention.

Referring first to FIGURE 1, there is shown a schematic diagram of the apparatus of the invention with the exception of the control circuitry, all of which is assumed to be carried by an aircraft above the terrain 21. Mounted substantially horizontally is a variable density transparency 22 which is an aerial photograph of the terrain 21. An electric motor 23 is mechanically connected, as by a wheel or pinion 24, to the transparency 22 for adjusting its angular position. A pick-off device 25 is also mechanically connected, as by a wheel or pinion 26, to the transparency 22 and generates a signal indicative of the angular position of the transparecy 22 about the optical axis 27 with respect to the frame of the aircraft.

A radiation sensor 28 is mounted on a plate or frame 29 wtih its sensitive area 31 above and substantially parallel to the transparency 22. The sensor 28 is preferably of the kind which generates two unidirectional voltages having amplitudes and polarities indicative of the power and position, in orthogonal directions, of the centroid of incident light, both of these voltages being zero when th ecentroid of illumination is at the center of the sensitive area. One such sensor suitable for use in the present invention is designated a Radiation Tracking Transducer, Model XY20D, manufactured by Micro Systems, Inc., San Gabriel, California.

The purpose of the apparatus is to align the transparency 22, or determine its misalignment, with the corresponding portion of the terrain 21, thereby determining the position and orientation of the aircraft with respect to the terrain beneath. Rotational alignment about the optical axis 27 is made by rotating the transparency 22 itself. Translational alignment, or more accurately measurement of misalignment, is achieved by translating the radiation sensor 28. Any suitable mechanical arrangement for moving the sensor 28 in orthogonal directions can be used but for illustrative purposes there are shown schematically a pair of mutually perpendicular racks 32 and 33 mechanically connected to the plate or frame 29 and engaged by pinions 34 and 35, respectively, which in turn are driven by motors 36 and 37 respectively in response to suitable signal voltages. It is to be understood that suitable slides or the like are required to permit one of the rack and motor assemblies to be moved by the other but since such mechanical details are well known and are not a part of the present invention it is deemed unnecessary to burden the present disclosure by their inclusion. Two pick-off devices, 38 and 39, are mechanically connected to the shafts of the pinions 34 and 35 respectively in order to generate signals indicative of the translational position of the sensor 31 with respect to the optical axis 27. For convenience, motion of the rack 32 is designated $x$ displacement while motion of the rack 33 is designated $y$ displacement.

With the apparatus properly adjusted and oriented, light rays from each portion of the terrain 21, typified by the ray 41, pass through corresponding portions of the transparency 22, all converging at the center of the sensitive area 31 to form a sharp correlation spot. Rotation of the transparency 22 diffuses the spot; translation of the transparency 22 simply translates the spot but the sensor 28 is translated a corresponding amount to place the spot on its center. It is also necessary that the distance between the transparency 22 and the sensitive area 31 be selected properly with due regard for the scale factor and altitude of the aircraft, but this adjustment usually is not subject to rapid change with moderate altitude changes and is assumed for present purposes to have been made manually.

Additionally, and regardless of the orientation or pictorial content of the transparency 22, there is formed on the sensitive area 31 a diffuse image of the terrain beneath which, as previously mentioned, is caused by the very small area of the transparency 22 compared to the area of the corresponding portion of the terrain beneath. The bright portions of the image so formed may be as bright or brighter than the correlation spot and it is necessary to distinguish the correlation spot from this background illumination. This is accomplished by periodically diffusing the correlation spot.

There is shown in FIGURE 1 a circular shutter denoted generally by the reference character 42 comprising segments 43 and 44 having light diffusing properties alternating with plain segments 45 and 46. The diffusing segments may for example be of glass with a minutely pebbled surface or may be a film containing a very fine uniform halftone screen. The plain segments are nonrefracting but should provide some attenuation so that the average transmission through each kind of segment is the same. Two pairs of segments are illustrated but it would be possible to use either one pair or more than two pairs. Although FIGURE 1 suggests that the shutter 42 is spaced from the transparency 22, the drawing is an exploded view and actually the shutter 42 and the transparency 22 are closely adjacent. Accordingly each segment should be large enough to encompass the entire area of the transparency 22.

The shutter 42 is rotated at a substantially constant speed, such as 3,000 r.p.m., by an electric motor 47 the shaft of which is mechanically connected to the shutter 42 for example by a wheel or pinion 48 engaging the periphery. The motor shaft also drives a generator 49 for the purpose of generating an alternating current in synchronism with and, in the present case of two pairs of segments, at twice the rotational frequency of the shutter 42. The generator may be of any kind that provides a suitable signal, such as an electric generator or a light commutator, the latter kind usually comprising a light source, a shutter and a photocell.

As each diffusing segment covers the transparency 22, the correlation spot is diffused, increasing in size but decreasing in sharpness and intensity. At the same time the background illumination is also further diffused but since the correlation spot is initially sharp while the background is initially diffused, the effect on the correlation spot is much more pronounced. Accordingly, the signals generated by the sensor 28 contain alternating components representing substantially the difference between the correlation spot and the background illumination. These components are detected and utilized as described below.

Referring now to FIGURE 2, there is shown the radiation sensor 28 which, it will be recalled, generates two unidirectional voltages, designated the $x$ and $y$ signals, indicative of the displacement of the spot from the center. The action of the shutter 42 causes each signal to have an alternating component at twice the rotational frequency, or 100 c.p.s. The $x$ signal is led to an amplifier 51 the output of which is applied to a synchronous detector 52.

The generator 49, rotated in synchronism with the shutter 42, generates an alternating current at twice the rotational frequency, or 100 c.p.s., which has its magnitude increased and its waveform shaped to a suitable form such as a square wave by an amplifying and waveform shaping circuit 53. The output of this circuit controls the synchronous detector 52 so that there is generated, on the conductor 54, a unidirectional error signal representing, by its polarity and magnitude, the direction and extent of the deviation of the correlation spot in the $x$ direction from the center of the sensor 28. This error signal is applied to a servo amplifier 55 which in turn controls the motor 36 so as to reduce the error signal to zero.

The $y$ signal is processed by a similar chain of components including an amplifier 56, a synchronous detector 57 also controlled by the output of the circuit 53, a conductor 58, and a servo amplifier 59 which controls the $y$ displacement motor 37.

The apparatus so far described provides translational, that is, $x$ and $y$ error signals substantially free from interference due to background illumination, but provides no means for sensing or correcting rotational misalignment of the reference transparency 22. To provide such sensing, there is shown in FIGURE 1 a circular shutter, denoted generally by the reference character 61, comprising a minor transparent portion 62 with the remaining portion 63 opaque. The shutter 61 is preferably of substantially the same size and shape as the reference transparency 22 and is mounted closely adjacent thereto. Neither the size nor the shape of the transparent portion 62 is critical but it should comprise a minor fraction of the total area. As shown for illustrative purposes, the portion 62 is sector shaped and comprises approximately one quarter of the total area. An electric motor 64 has its shaft mechanically connected to the shutter 61, as by a wheel or pinion 65, so as to rotate the shutter 61 at a substantailly constant speed different from the speed of the shutter 42, for example 1200 r.p.m. A generator 66, such as an electric generator or a light commutator, is connected to the shaft of the motor 64 and generates an alternating current having a frequency equal to the rotational frequency of the shutter 61.

Figure 3:
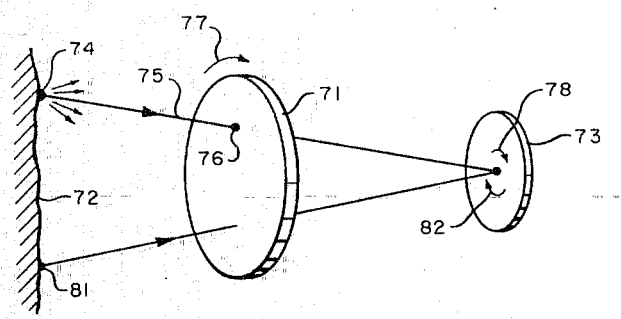
FIGURES 3 to 7 are schematic diagrams useful in explaining the invention.

Referring now to FIGURE 3, there is shown schematically a reference transparency 71 assumed to be properly aligned with the primary information source 72, such as the terrain, forming a correlation spot at the center of a detecting plane 73. Consider first only that light from an elemental area 74 on the source. Rays of light emanate in all directions, the ray 75 passing through the corresponding portion 76 of the transparency 71 to the center of the detecting plane 73. If now the reference transparency 71 be rotated a few degrees clockwise, as shown by the arrow 77, it is obvious that a different ray of light will pass through the portion 76 with the result that the spot on the detecting plane 73 is shifed in the same direction, as illustrated by the arrow 78.

If we consider only that light from a second elemental area 81 diametrically opposite the area 74, it is obvious that rotation of the transparency 71 will shift the spot in the opposite direction, as shown by the arrow 82. Considering all of the areas, it is apparent that rotational misalignment rotates the correlation spot and at the same time diffuses and enlarges it.

Figure 4:
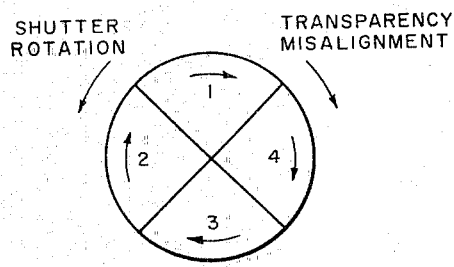
Figure 5:
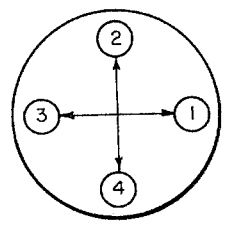

Rotation of the shutter 61 of FIGURE 1 causes the sensor 28 to view or sense various portions of the correlation spot successively. FIGURE 4 represents schematically the shutter 61 which is assumed to be rotating counterclockwise. The numerals represent succesive angular positions of the transparent area 62. It is assumed that the reference transparency 22 is misaligned in the clockwise direction. In the first position, the shutter 61 masks everything except the upper quadrant, and accordingly at this time the correlation spot is shifted clockwise, that is, to the right as shown by the small arrow. At the second position, the spot is shifted upward; at the third position it is shifted to the left; and finally in the fourth position it is shifted downward. These shifts in position are further illustrated in FIGURE 5 wherein the numerals again represent the successive positions of the transparent area 62 while the arrows represent the corresponding displacement of the correlation spot. In summary, with clockwise misalignment of the transparency 22 and counterclockwise rotation of the shutter 61, the correlation spot rotates counterclcokwise and lags the shutter position by ninety degrees.

Figure 6:
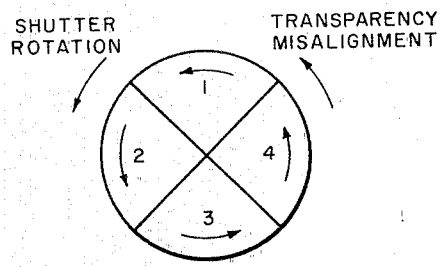
Figure 7:
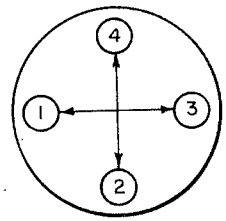

FIGURES 6 and 7 are a similar analysis in which the shutter 61 is again assumed to be rotating counterclockwise but in which the transparency is assumed to be misaligned in the counterclockwise direction. It is apparent that the correlation spot again rotates counterclockwise but that it now leads the shutter position by niney degrees.

The rotation of the correlation spot occurs whether or not the apparatus is properly aligned in x and y. If it is so aligned, as assumed in FIGURES 3–7, the spot rotates about the center of the detecting plane. Such rotation places another alternating component on the x and y signals generated by the sensor 28 which component also appears in the x and y error signals on the conductors 54 and 58 of FIGURE 2. The nature of these components is illustrated in FIGURES 8–11.

Referring now to FIGURE 8, the variation of the x error signal is shown for clockwise rotational misalignment of the transparency 22 and counterclockwise rotation of the shutter 61. The abscissa is the angular position of the transparent area 62, indicated by the numerals 1, 2, 3 and 4 as in FIGURES 4–7. The ordinate is the x error signal. When the shutter is in its number 1 position, the correlation spot is shifted to the right and accordingly the x error signal is positive. At the number 2 position the x error signal is zero; at the number 3 position, the x error signal is negative; at the number 4 position, the error signal is again zero; and when the number one position is again reached, the error signal is again positive. Joining of these points forms the curve 91.

The curve 92 of FIGURE 9 similarly indicates the variation in the y error signal for clockwise rotational misalignment of the transparency 22 and counterclockwise shutter rotation.

The curves 93 and 94 of FIGURES 10 and 11 illustrate the variations in the x and y error signals respectively for counterclockwise rotational misalignment of the transparency 22 and counterclockwise shutter rotation.

FIGURES 8–11 show that the x and y error signals contain alternating components indicative of the rotational error in the alignment of the transparency 22. These components are at the frequency of rotation of the shutter 61. FIGURES 8 and 10 show that the x error signal for a counterclockwise rotational misalignment is displaced in phase by 180° with respect to the error signal for clockwise rotational misalignment. FIGURES 9 and 11 show that the y error signal exhibits a similar phase reversal for rotational errors of opposite sense. Therefore either the x error signal alone or the y error signal alone could be used to correct rotational errors. However it is preferred at present to utilize the information in both the x and the y error signals. Comparison of FIGURE 8 with FIGURE 9 and of FIGURE 10 with FIGURE 11 shows that in each case the y error signal lags the x error signal by 90°. Hence the information content of the two signals can be combined.

Referring again to FIGURE 2, the x error signal on the conductor 54 is applied to a phase shifting circuit 95 which shifts the phase of the alternating component by −90° to bring it in phase with the y error signal component. The output of the phase shifter 95 is applied to an adding circuit 96 where it is combined with the alternating component of the y error signal on the conductor 58. The combined signal is applied to a synchronous detector 97.

The generator 66, it will be recalled, generates an alternating voltage in synchronism with and at the rotational frequency of the shutter 61. This voltage is amplified and its waveform converted to a suitable form, such as a square wave, by the amplifier and shaper 98, after which it is applied to the synchronous detector 97. Accordingly there is developed on the conductor 99 a unidirectional error signal indicative of rotational misalignment. This error signal is applied to a servo amplifier 101 which in turn controls the motor 23 to correct any misalignment.

It is apparent from the above description that the present invention provides apparatus for aligning a transparency with primary information such as the terrain. Error signals are generated indicative of both translational (x and y) and rotational misalignment and apparatus is provided for reducing the error signals to zero. In each case the error signals generated represent substantially the difference between the intensities of the correlation spot and the background illumination. The apparatus eliminates the problems of wear, vibration, etc. inherent in apparatus using oscillatory motion by substituting therefor continuous rotary motion.

In operation, the device is automatically aligned properly. The pick-off devices 25, 38 and 39 generate signals indicative of the position of the apparatus with respect to a reference such as the frame of an aircraft. These signals may be used as inputs to navigation equipment or other computing devices.

Although a preferred embodiment has been described in considerable detail for illustrative purposes, many modifications will occur to those skilled in the art. It is therefore desired that the protection afforded by Letters Patent be limited only by the true scope of the appended claims.

What is claimed is:
1. In an optical correlator in which a radiant energy sensor generates signals in response to light transmitted from an illuminated body and passing through a rotatable transparency representative of the light transmitting characteristics of said body in reduced scale, the improvement which comprises;
   a first shutter having alternately arranged diffusing and nondiffusing portions,
   said first shutter being positioned adjacent to said transparency and optically aligned therewith and said first shutter being rotated continuously at a first speed for periodically diffusing all light transmitted through said transparency for causing the signals generated by said sensor to include first alternating components at a first frequency, a second shutter having a minor portion of its area transparent and the remainder opaque, said second shutter also being positioned adjacent to said transparency and optically aligned therewith, said second shutter being rotated continuously, in axial alignment with said transparency, at a second speed, for periodically passing light transmitted from said body through said transparency whereby if said transparency is not aligned rotationally with said illuminated body, the signals generated by said sensor include second alternating components at a second frequency, first means for detecting said first components for generating error signals indicative of translation misalignment, and second means for detecting said second components for generating error signals indicative of rotational misalignment.

2. In an optical correlator as in claim 1 and further including, means responsive to said error signals generated by said first detecting means for positioning said sensor for correcting translation misalignment.

3. In an optical correlator as in claim 1 and further including, means responsive to said error signals generated by said second detecting means for positioning said transparency for correcting rotational misalignment.

4. In an optical correlator as in claim 1 and further including, first means responsive to the error signal generated by said first detecting means for positioning said sensor for correcting translation misalignment, and second means responsive to the error signal generated by said second detecting means for positioning said transparency for correcting rotational misalignment.

References Cited by the Examiner

UNITED STATES PATENTS 3,001,437  11/1961  Taylor _____ 88—14 X
3,234,845  2/1966   Stavis _____ 88—14 X JEWELL H. PEDERSEN, *Primary Examiner.*

A. A. KASHINSKI, *Assistant Examiner.*